E. V. TURNER.
VELOCIPEDE.
APPLICATION FILED JULY 27, 1909.
959,656.
Patented May 31, 1910.
2 SHEETS—SHEET 1.
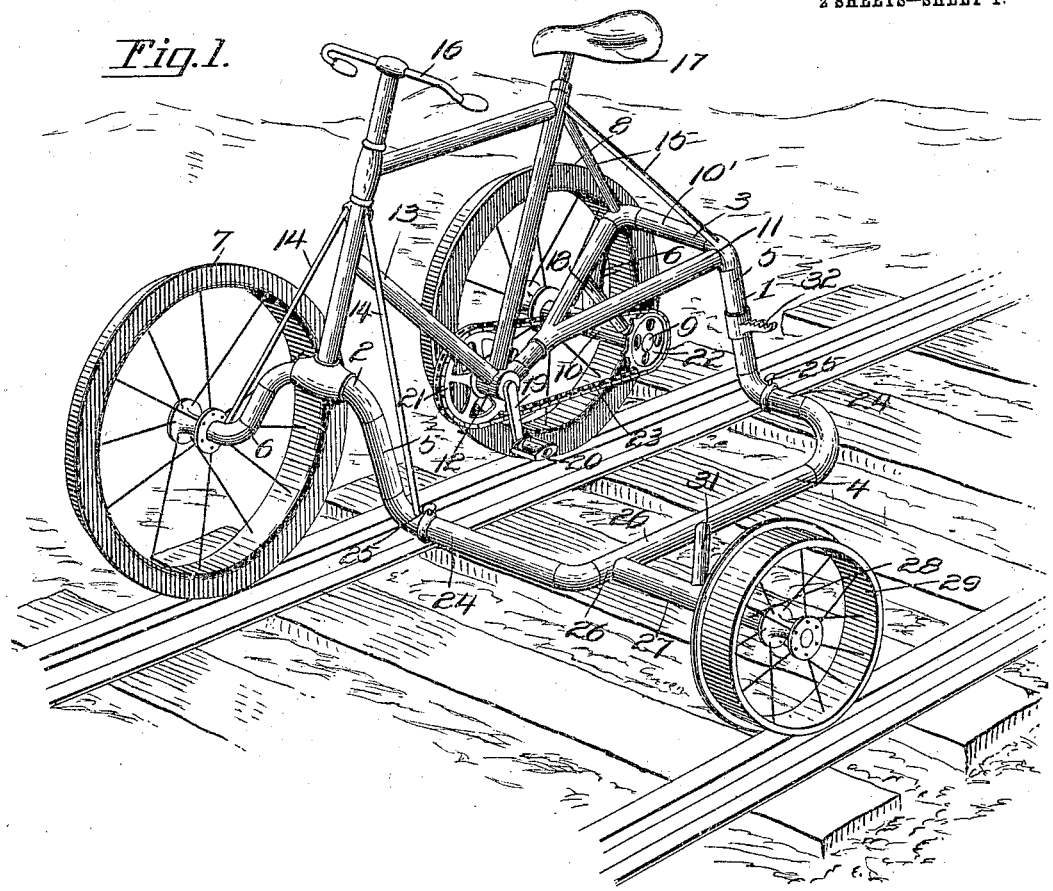
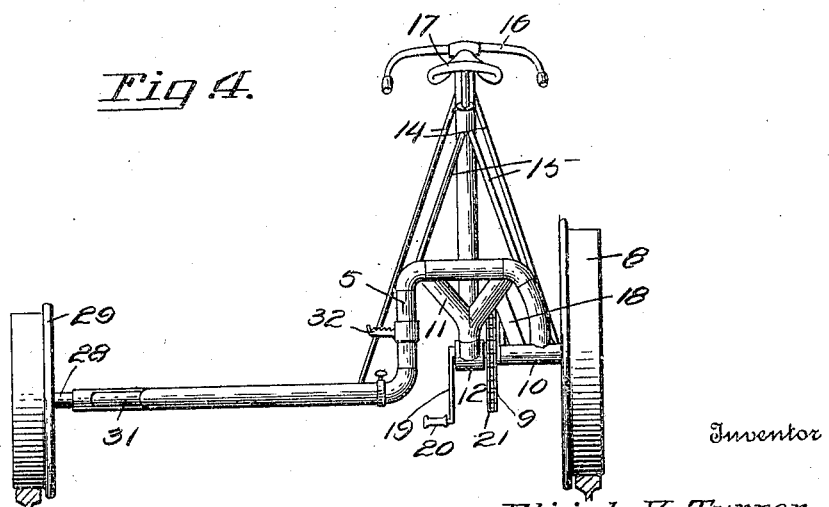
Witnesses
F. C. Gibson.
D. W. Gould.
Inventor
Elijah V Turner
By Victor J. Evans
Attorney E. V. TURNER.
VELOCIPEDE.
APPLICATION FILED JULY 27, 1909.
959,656.
Patented May 31, 1910.
2 SHEETS—SHEET 2.
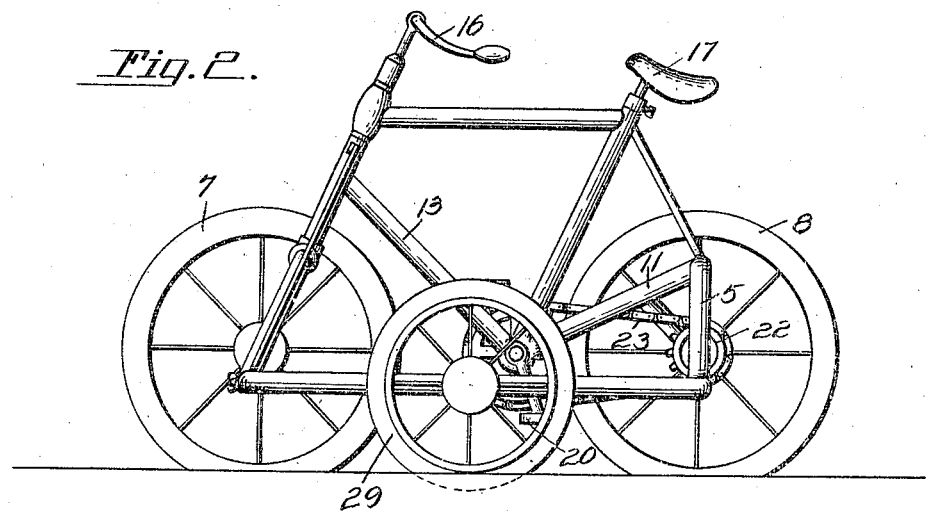
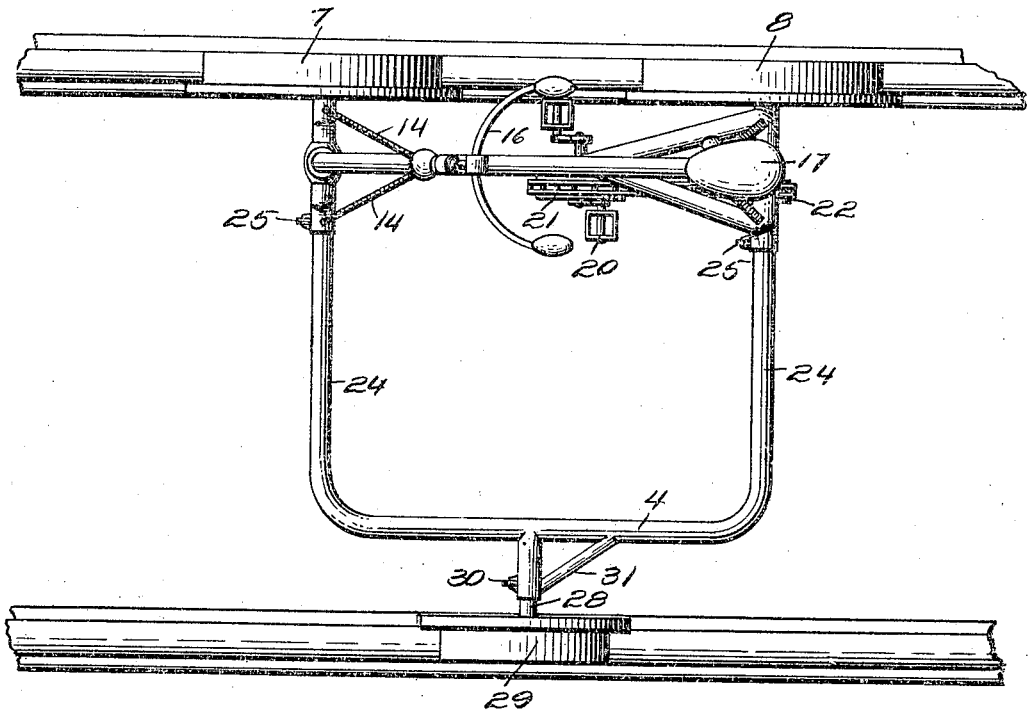
Witnesses
F. C. Gibson
D. W. Gould
Inventor
Elijah V. Turner.
By Victor J. Evans
Attorney

UNITED STATES PATENT OFFICE.

ELIJAH V. TURNER, OF JOHNSON CITY, TENNESSEE.

VELOCIPEDE.

959,656.

Specification of Letters Patent.　Patented May 31, 1910.

Application filed July 27, 1909.　Serial No. 509,767.

*To all whom it may concern:*

Be it known that I, ELIJAH V. TURNER, a citizen of the United States, residing at Johnson City, in the county of Washington and State of Tennessee, have invented new and useful Improvements in Velocipedes, of which the following is a specification.

The invention relates to an improvement in velocipedes for railway track travel, and is particularly directed to a velocipede of comparatively light structure in which the parts are arranged to secure the maximum stability in use and to provide for separation to permit of close storage when not in use.

The main object of the present invention is the provision of a railway velocipede in which the rider's seat is arranged to distribute the load in part to the auxiliary track wheel, whereby the latter is prevented from mounting the track in rounding curves at high speed or in riding switch points, whereby the stability of the machine is materially increased.

Another object is the provision of a frame structure constructed to provide a platform section for the reception of any desired luggage, which frame structure is arranged for separation to permit of close storage of the parts when the machine is not in use.

The invention will be described in the following specification, reference being had particularly to the accompanying drawings, in which—

Figure 1 is a perspective view of the improved machine. Fig. 2 is a side elevation of the same. Fig. 3 is a plan of the same. Fig. 4 a rear elevation of the same.

Referring particularly to the accompanying drawings, the improved velocipede comprises a main frame 1 including front and rear wheel sections 2 and 3 and a platform section 4. The front and rear wheel sections are practically identical in form, being of inverted U-shape in elevation with their inner side lengths 5 of greater length than the outer side lengths 6. The axle of the forward main wheel 7 is mounted in the outer lengths 6 of the forward wheel section, the latter being outwardly turned at its terminal to provide for the reception of the axle. The rear main wheel 8 is fixed upon an axle 9 revolubly mounted in a sleeve 10, to which latter at a point intermediate its ends is fixed the free terminal of the shorter length 6 of the rear wheel section 3. Secured to the cross bar 10' of the rear wheel section 3 of the main frame is V-frame 11 which at the forward end supports the crank hanger 12 of an ordinary diamond frame 13 of the usual bicycle construction, the lower end of the handle post of such frame being connected to the cross bar of the forward wheel section 2 of the main frame. Brace rods 14 lead from the handle post of the diamond frame to the forward wheel section 2, and brace rods 15 connect the upper end of the seat standard of a diamond frame with the cross bar 10' of the rear wheel section 3. The diamond frame 13 is provided in the usual manner and at the usual point with a handle bar 16 and a seat 17, the latter being adjustably mounted for variation in height in the usual manner. One of the bars of the V-frame 11 is provided with brace rods 18 between it and the sleeve 10.

Within the hanger 12 is arranged the usual crank 19 carrying pedals 20 and a sprocket wheel 21, and on the inner end of the axle 9 of the rear main wheel is fixed a sprocket 22. The parts are so arranged that the sprockets 21 and 22 are in alinement longitudinally of the frame, and a sprocket chain 23 is arranged to engage said sprocket wheels to transmit the power from the drive sprocket 21 to the rear main wheel 8 and thereby propel the velocipede.

The platform section 4 of the main frame is of U-shape in plan, the free terminals of its side bars 24 being formed to seat within the hollow ends of the side lengths 5 of the front and rear wheel sections. Set screws 25 are arranged to secure the parts in connected relation, it being obvious from this construction that when desired the platform section 4, and the parts connected thereto may be separated from the remainder of the main frame and the parts connected thereto to permit of compact storage. From a point intermediate the ends of the cross bar 26 of the platform section there is projected a hollow section 27 formed at its outer end to receive the axle 28 of the auxiliary track wheel 29, a set screw 30 being arranged to secure the axle in adjusted position within the section 27. By this means the auxiliary wheel may be adjusted relative to the main wheels to compensate for any variations in track gage. A brace rod 31 is arranged intermediate the cross bar of the platform section and the track section 27, and a step 32 is secured upon the rear wheel section 3 in a position convenient for use in mounting the velocipede.

It will be noted that the seat is supported above the apex of the V-frame 11, and that the latter is arranged inwardly from the plane of the main wheel. Therefore, the weight of the rider is in part distributed to the auxiliary wheel 29, and is not directly or approximately above the main wheels 7 and 8. By this arrangement the stability of the machine is increased as the weight on the auxiliary wheel prevents the latter from leaving the rail in rounding curves or in engaging switch points or the like. The respective wheels are, of course, of the usual flange construction with the auxiliary wheel of less diameter than the main wheel. It is incident to the difference in diameter that the inner lengths 5 of the front and rear wheel sections 2 and 3 of the main frame are longer than the outer lengths of such sections, as the platform section must, of course, be horizontal and on a plane with the axis of the auxiliary wheel. The platform section is designed for use as a support in carrying luggage, tools or the like, and may, if desired, be provided with a solid platform of wood or other material.

The various parts of the frame structure are preferably of hollow construction to insure lightness, and it is to be understood that if desired any approved type of motor may be mounted to convert the machine from a manually driven to a power driven velocipede.

I claim:

1. A railway velocipede including a main frame comprising front and rear wheel sections and a platform, a sleeve connected to the rear wheel section, a main wheel supported by the sleeve, a main wheel connected to the forward wheel section, and an auxiliary wheel connected to the platform section.

2. A railway velocipede including a main frame comprising front and rear rail sections and a platform, a sleeve connected to the rear wheel section, a main wheel supported by the sleeve, a main wheel connected to the forward wheel section, and an auxiliary wheel adjustably connected to the platform section.

3. A railway velocipede including a main frame comprising front and rear rail sections, and a platform section, a main wheel connected to the front wheel section, a sleeve connected to the rear wheel section, a main wheel mounted in said sleeve, a V-frame connected to the rear wheel section, a bicycle frame supported from the V-frame, driving mechanism intermediate the bicycle frame and sleeve, and an auxiliary wheel connected to the platform section.

In testimony whereof I affix my signature in presence of two witnesses.

ELIJAH V. TURNER.

Witnesses:
 DAVID W. GOULD,
 JOHN L. FLETCHER.